UNITED STATES PATENT OFFICE.

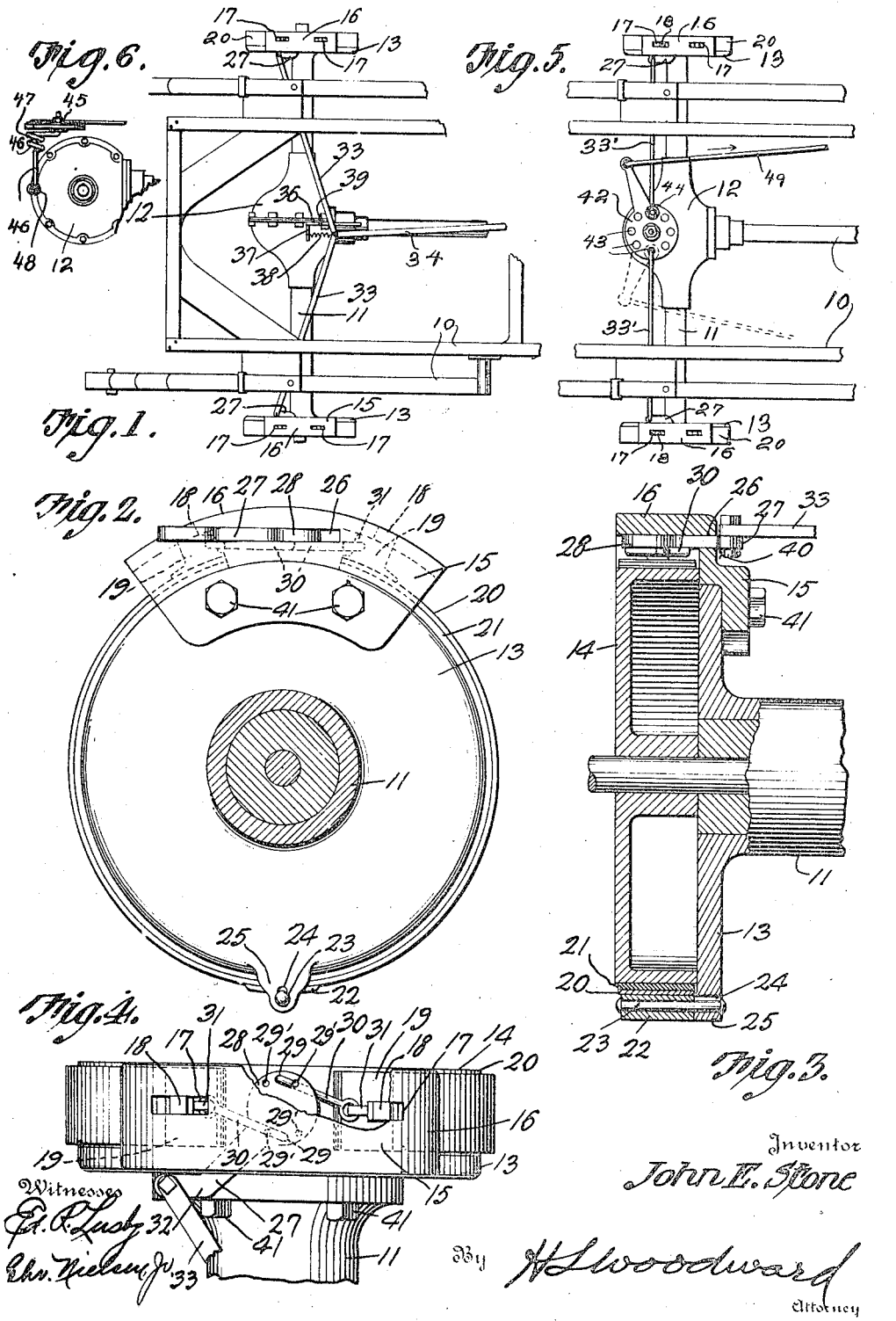

JOHN E. STONE, OF SWEET WATER, TEXAS.

MOTOR-VEHICLE BRAKE.

1,153,726.  Specification of Letters Patent.  Patented Sept. 14, 1915.

Application filed November 25, 1914. Serial No. 873,935.

*To all whom it may concern:*

Be it known that I, JOHN E. STONE, a citizen of the United States, residing at Sweet Water, in the county of Nolan and State of Texas, have invented certain new and useful Improvements in Motor-Vehicle Brakes, of which the following is a specification.

The invention seeks to give an improvement in brakes especially suitable for motor vehicles, by which the objectionable action of the brakes now generally used, in locking one wheel before proper braking action occurs on the other, will be prevented by the natural and automatic action of the device. At present in order to prevent unequal action in opposite band brakes, where operated by direct link connections from a hand lever, it is necessary to make extremely nice manual adjustments, and it is the purpose of my invention to enable direct link connections between the hand lever and two brakes with elements so arranged that an equalizing action will occur without the use of intermediate levers, or cables and pulleys.

It is also a purpose to obviate the necessity for large bearings for the brake connection elements by so arranging the parts that there will be a practical absence of force tending to throw the parts pivotally connected off of their axes when the brakes are applied. Consequently and further, the necessity for machined fittings is greatly reduced, and in the connections between the ends of a brake band and a rocking lever element I am enabled to use simple steel wire links in hooked engagement with band and lever, without liability of casual disengagement or objectionable lost motion.

Additional objects, advantages, and features of invention will appear in the construction, arrangement and combination of parts of my invention, one of the possible embodiments of which is herein described and shown in the drawings, where—

Figure 1 is a plan of the rear part of a motor vehicle chassis equipped with my invention, Fig. 2 is an elevation of a brake drum and mounting for the brake, showing the invention with the brake rods disconnected, Fig. 3 is a vertical cross section of the brake, Fig. 4 is a top view thereof, Fig. 5 is a fragmentary plan of the chassis with a preferred form of operative connections between the opposite brakes. Fig. 6 is a side view of the mounting of the central lever.

There is illustrated an engine chassis 10 of any usual construction, including the rear axle housing 11 and differential housing 12, of familiar form and construction, the rear axle housing having at the outer ends the usual circular frame plate 13 concentric with the housing and of a size corresponding to that of the brake drum 14, which may be of any usual form and attached to a wheel, not shown, in any customary manner. The frame plate 13 is provided with an upward extension 15, having a flange 16, extending over and concentric with the drum 14, this flange having longitudinal slots 17 in the medial plane of the drum in which there are slidably engaged rectangular lugs 18 formed on blocks 19 secured upon the outer face of the spring band 20 at its extremities. This band with the usual lining 21 may be termed the brake band. At its middle on the outer side, an anchor block 22 is fixed, having a pin 23 extended therefrom through a vertical slot 24 in an anchor lug 25 formed on the frame plate 13 at its lower part, projected outwardly a sufficient distance. The extension 15 is formed with a horizontal rectilinear slot 26 centrally over the axis of the drum through which there is slidably engaged a lever 27 having an enlarged disk-like base portion 28, the disk and the body of the lever being stamped integrally of one piece of sheet metal. The disk is formed with opposed openings 29 on opposite sides of the axis of the lever close to the periphery of the disk portion and preferably on a radius of the disk at an angle of about forty-five degrees to the axis of the lever. Engaged in these openings there are links 30, having hook ends engaged through the respective apertures, their outer ends being similarly engaged through apertured ears 31 on the blocks 19. The outer end of the lever is secured as at 32, whereby it extends some distance laterally beyond the end of the slot 26 when in initial position. The levers at each side of the chassis are so arranged as to extend rearwardly in initial position, and when in this position, the openings 29 of the disk are in a line with the axis of the drum, substantially. In case greater or less movement or leverage force is desired to be exerted on the links, they may be adjusted in additional openings 29' spaced arounr the disk portion of the lever. The outer ends of the levers have pivotally connected the to lateral rods 33 inclined slightly forward toward their inner ends, and commonly connected thereat to the rear end of a main rod 34, which is extended forwardly adjacent the center of the axle, and may be connected to any customary brake lever employed. The main rod may be inclined toward one side or the other of the chassis if desired, and if considerable inclination is necessary, the difference in lateral position may be compensated for by the use of the usual counter shaft and arm. It being customary in the late types of cars to dispose the control levers centrally of the vehicle, there will not be any difficulty on this account and the rod 34 may be connected directly to the hand lever. For the support of the rods 33 and 34, a device 36 is secured upon the differential housing by which the rod 33 at one side is slidably held. If desired, an extension may be formed on the member 36 at the rear, with an outer extremity turned to one side as at 37, and a spring 38 coengaged between this extremity and the inner ends of the rods 33. By this means the brake will be returned to disengaged position positively, when the hand lever is disengaged or freed for releasing movement, and by forming a limiting stop 39 for the engaging rod, the parts will be held against rattling.

The construction described and shown makes the brake easily accessible, the extension 15 serving as a protecting casing for the brake, so that the mud, sand and stones cannot easily get into the space between the ends of the band, and also the device is protected against mud or slush becoming packed and frozen between the band ends or in the path of the lever and impeding or preventing action of the brake. The rods 33 may be connected to the levers by suitable pins 40, which may be secured by cotter pins for quick removal, after which the removal of two bolts 41 holding the extension 15 in place will allow removal of the extension piece, and the operative parts will be exposed to view and easily accessible for adjustment or repair. The location of the band connections at the upper side of the drum also facilitates access to the parts.

It will be apparent that the lever construction at 27 and 28 and the connections between the lever and band ends are of a character which may be readily applied in various situations other than that illustrated, and would be useful in clutches, planetary transmissions, and other devices, so that I regard the scope of my invention as including such applications as indicated.

I have illustrated in Figs. 5 and 6 a preferred form of connection between the levers 27, which consists in leading rods 33' therefrom to a large lever 42, having the same form as the levers 27, as regards the disk portion, and having concentrically spaced apertures 43 therearound, in two of which the inner ends of the rods 33' are secured as at 44. This large lever is secured as at 45 to the upper end of a spring staff 46, having an intermediate helix 47 formed therein and its upper part cranked as shown. The lower end is formed with an eye engaged with the usual bolt and nut at 48, used to hold the differential housing together. From the outer end of the lever the main brake rod 49 is extended. It will be seen that by the use of this lever it may be connected to allow direct connection in the most efficient way with a brake lever at either side of the chassis, as indicated in dotted lines, and the mounting of the lever permits it to swing and thus act as an equalizer between the opposed brakes.

What is claimed:

1. In a device of the class described comprising two rotating brake drum elements, oppositely moving brake elements for each drum, a lever adjacent each drum oscillable in a plane parallel to the axis of the drum, said levers having principal arms movable toward each other for braking action, a connection between the levers yieldable to lateral force applied thereto, eccentric connections between each lever and each brake element adjacent respective drums, and an operating rod engaged with the said connections between the levers centrally of the connections, said levers and rods being all operative nearly or quite in a common plane.

2. A device of the class described comprising a drum, a frame piece thereadjacent, a band encircling the drum, an anchorage means therefor, said band having relatively movable ends, an extension piece on the frame piece having a flange concentric with the drum and having longitudinal slots therein alined with the drum, blocks on the band ends having lugs slidable in the slots, said extension piece having a horizontal slot therein, a lever having a disk portion at its inner end engaged oscillably in the slot, and eccentric connections between the disk and said blocks.

In testimony whereof I affix my signature in presence of two witnesses.

JOHN E. STONE.

Witnesses:
H. L. WOODWARD,
WALLACE J. HILL.